Figure 1:
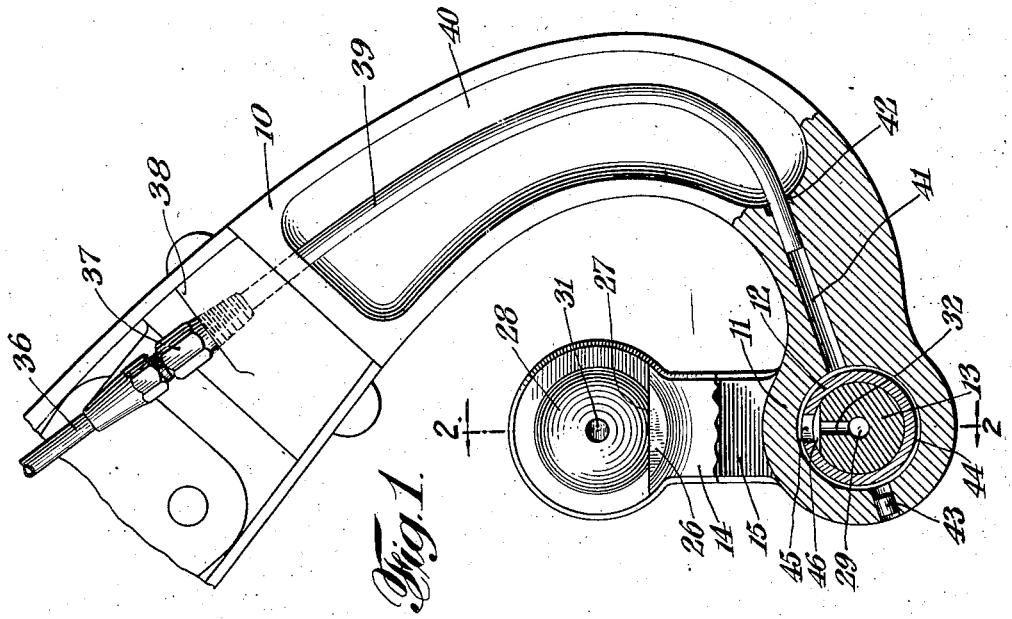

Feb. 15, 1927.  1,618,122
J. BIJUR
AUTOMOBILE CHASSIS LUBRICATION
Filed March 24, 1926

Inventor
Joseph Bijur
By his Attorneys
Dean, Fairbank, Obright & Hirsch

Patented Feb. 15, 1927.

1,618,122

UNITED STATES PATENT OFFICE.

JOSEPH BIJUR, OF NEW YORK, N. Y., ASSIGNOR TO AUTO RESEARCH CORPORATION, A CORPORATION OF DELAWARE.

AUTOMOBILE CHASSIS LUBRICATION.

Application filed March 24, 1926. Serial No. 96,919.

My present invention is primarily concerned with automobile chassis lubrication and has reference more particularly to the lubrication from a source on the vehicle structure, of an associated bearing, which performs in use, an oscillating or swinging movement in its entirety relative to the vehicle structure. While the invention in its broader aspects is applicable to lubricating the saddles of cantilever springs, parts of the brake rigging and spring shackles generally; it is shown in a preferred application to a spring shackle of the tension type.

In chassis lubrication, it is undesirable to greatly overlubricate any bearing, because excess oil accumulates thereat and is apt to soil the clothing of the passengers, to drip upon the floor of the garage and by reason of the waste thus incurred, to necessitate unduly frequent replenishment of the oil supply. In the application of the invention to tension shackles and analogous constructions, a limber conduit leading to the oscillating upper bearing from the fixed support structure is likely to be vulnerable, while the elevation of an adequate supply of lubricant to the upper bearing from the lower bearing might involve considerable overlubrication of the latter, with the disadvantages just pointed out were the oil fed past the lower bearing.

It is, accordingly, an object of the invention to adequately lubricate with clean oil from a single source, both of the bearings of a construction such as a tension shackle, but without incurring excessive overflow at either bearing. More specifically, it is among the objects to raise from the vehicle structure to the upper or oscillating bearing of the shackle, without incurring leak through any moving joint therebetween, a supply of lubricant adequate for the needs of said upper bearing, and to accomplish this without complicating or rendering more bulky the construction of shackles commonly used, or providing any exposed or loose or flapping conduit or swivel, or employing an inlet fitting different from those for supplying lubricant to the other bearings on the chassis.

In order to introduce the lubricant from the fixed vehicle structure into the bearing member which has a pivoting movement with respect to said structure, I provide a relatively open entry passage across the surface where the swiveling action occurs, through which the lubricant will readily flow, rather than to leak from the bearing. In a preferred arrangement, the lubricant is admitted into the rocking bearing at the loaded side thereof, that is, at the side on which the bearing sustains the weight of the vehicle body. Inasmuch as it is not convenient in all types of construction to admit lubricant from the frame directly into the loaded side of the bushing, I may admit the lubricant at any part convenient, causing it to pass to the loaded side by way of a peripheral groove about the press-fitted bushing. Preferably the bearing has a flat adjacent the point of entry for lubricant, so that precise registry between oil holes will be unnecessary.

The lubricant is conveyed from the inlet in a lubricant-tight path along the structure of the shackle to the bearing surfaces thereof. In a preferred application, the lubricant flows through a passage formed in a rigid yoke structure made up of the two shackle bolts and one of the shackle links, so that no leak can take place in the travel into and from the link in the course from one to the other of the bolts. The requirements of the lower bearing are met in whole or in part by gravity return of oil from the connecting passage that leads to the upper bearing.

Another feature of the invention is to reduce the effective volume of the bore through which the lubricant is raised from the lower to the upper bearing, by substantially filling the same with a core, thereby reducing the volume of lubricant to be replenished in each operation, preliminary to supplying the upper bearing.

The invention herein claimed is an improvement on the invention disclosed in my copending applications Serial No. 604,464 filed December 2, 1922, and Serial No. 654,606, filed July 30, 1923, wherein the broader features herein claimed are described.

Figure 2:
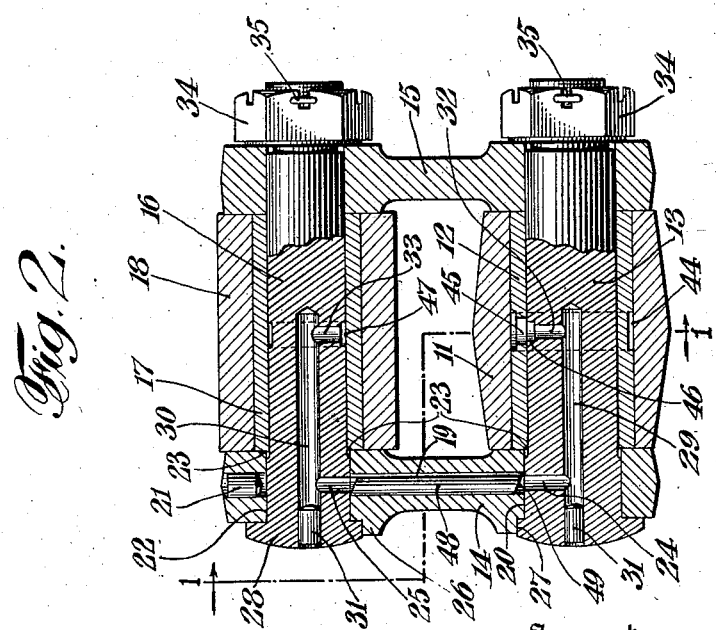

In the accompanying drawings in which is shown one of various possible embodiments of the several features of this invention, Fig. 1 is a side view of one preferred form of tension shackle installation, taken on line 1—1 of Fig. 2 and Fig. 2 is a sectional view taken along the line 2—2 of Fig. 1.

Referring now to the drawings, I have shown the rear end or horn 10 of a motor vehicle channel frame which terminates in an eye 11 into which is press-fitted a bushing 12. The bushing encircles the lower bolt 13, the protruding ends of which engage respectively the links 14 and 15 through the upper eyes of which extends the upper bolt 16 encircled by the bushing 17 of the spring eye 18. The shackles of the type shown, are known as "tension shackles" because when installed, the weight of the vehicle body is suspended from the lower ends of the links and exerts tension thereon.

The link 14 of the shackle is provided with a longitudinal bore 19 extending from the upper end thereof and breaking through the eye 20 at the lower end thereof, a plug 21 sealing the upper or outer end of said bore. The bolts 13 and 16 are press-fitted or otherwise tightly secured respectively into the corresponding eyes 20 and 22 in the link 14, to form an oil-tight connection therewith. In order to avoid injuring the bearing surface of the bolts, while driving them into place, the bolts are stepped at 23 so that the head portion thereof press-fitted into the link 14 is of larger diameter. The upper and lower bolts have respectively a radial bore 25, 24 brought into registry with the longitudinal bore 19 of the link in the assembly, as shown, preferably by providing the link with integral lugs 26 constituting stops for corresponding flats 27 on the heads 28 of the bolts. The radial bores of the upper and lower bolts communicate respectively with axial bores 30, 29, each of which is plugged at 31 at its outer end. The axial bores 29, 30 are in communication near their inner ends respectively with radial bores 32, 33, said bores extending toward each other in the assembled construction.

The two bolts 13, 16 and the link 14 being preassembled, into a rigid unitary yoke in the manner described, the shackle is installed or applied by extending the end of the lower bolt through the frame bushing 12 and the end of the upper bolt through the spring bushing 17, then applying the complementary link 15 over the protruding ends of the bolts, tightening the nuts 34 and inserting the cotter pins 35 to complete the assembly.

For admitting lubricant to the shackle, I have illustratively shown the frame line 36 of a central chassis lubricating system, which may be of any of various types. I have shown the exterior of a flow controlling fitting 37 actuated from a central source of pressure, the specific construction of which fitting need not be shown nor described, as it is not in itself material to the present invention. This fitting is shown applied in a corresponding boss 38 in the frame and leads to a curved length of pipe 39 lodged in the channel 40 of the frame horn and delivering into the eye 11 of the frame by telescoping its extremity into a corresponding bore 41 and soldering in place therein at 42. The bore is conveniently formed longitudinally of the extremity of the frame, as shown, and extending substantially diametrally of the eye 11 and plugged at 43 at its outer end. By the construction disclosed, the length of pipe 39 is well protected within the channel construction so that it is not subject to injury by collision or by the application of a tow rope. The lubricant delivered through the pipe 39 enters a peripheral groove 44 about the exterior of the bushing 12, said groove delivering through an aperture 45 at the loaded, in this case the upper part thereof, to the radial bore 32 of the lower bolt. The bolt, as shown, is formed with a short narrow flat 46 at bore 32 in order to assure registry with the bushing hole 45, regardless of variations. Among the variations thus compensated for, are those incurred in the manufacture of the axles and springs, those due to inaccuracies in the pressing in of the bushings and those due to inaccuracies resulting from different characters of vehicle bodies and from varying passenger loads. The flat 46 while long enough to accommodate these variations should yet not be so long as to materially reduce the effective carrying surface. The flat also reduces the cutting angle of the edge of the bolt hole relative to the bushing and tends to prevent particles of worn bearing material from clogging the bore.

The upper bolt is preferably formed with a flat peripheral groove 47 from which the lubricant is distributed in a manner that will appear presently. Inasmuch as the lower bolt is devoid of this groove, the bolts are differentiated in construction, and to avoid the possibility of applying the spring eye bolt through the frame eye, I have shown the lower bolt of larger diameter than the upper.

In operation, lubricant from the source of pressure, will be forced past the flow control fitting 37 through pipe 39 and bore 41 to bushing groove 44, whence it will pass through aperture 45 into bore 32, thence by way of longitudinal bore 29, radial bore 24, link bore 19, radial bore 25 and longitudinal bore 30 through bore 33 to the upper bushing.

The lubricant is fed from the bushing 12 to the lower bolt across the loaded side of the latter, so that the pressure from the source will be effectively transmitted across the bearing surface. While, in general, it is preferred specifically to admit the lubricant to the rocking member across the loaded side thereof, it is sufficient, especially in relations in which the bearing carries no substantial load, to admit the lubricant more generically for flow transversely across the bearing through a course affording a path of less resistance than through which the oil would have to pass along the bearing to leak therefrom. By my invention, the pressure of the lubricant will, accordingly, be transmitted through the length of the substantially lubricant-tight U-shaped passage in the preassembled yoke made up of the two bolts 13 and 16 and the connecting link 14. The lubricant need not be elevated above the axis of the upper bolt, since it flows downward from bore 30 through the depending radial bore 33 which leads to the loaded side of spring bushing 17. The lubricant spreads along the peripheral groove 47 about bolt 16 until it has reached a relatively unloaded part from which it will readily spread longitudinally, to effectively lubricate the upper bearing. Some of the lubricant from the bushing port 46 will spread along the lower bolt to lubricate the latter. Excess lubricant stored in the passages above bolt 13 will slowly descend after the pressure operation has ceased, and will further lubricate the bearing surface of the lower bolt 13.

In a preferred embodiment, the bore 19 is substantially filled, preferably with a core which may be a solid pin or rod 48, preferably bent so as to be friction-held in place therein. The rod need not be specially handled in assembly as it remains in place in the link. Preferably, the ends of the rod are cut oblique at 49, as shown, to avoid the possibility of sealing therewith, the passage to or from either of the bolts. By the use of this core, it will be seen that although the bore 19 is of relatively large diameter, conveniently bored with a large and sturdy drill, yet the effective volume of the bore is relatively minute. Without the use of the core 48, the charge needed for each lubrication, is in excess of the substantial volume of the link bore, as the latter would have to be completely replenished before delivery to the upper bearing could occur. By the use of the core 48, as described, the admission of even a small charge would result in emission to the upper bolt, especially, since the link bore normally remains filled by the capillary action due to the small effective passage therein. This capillary relation also prevents draining of the lubricant held in the bore 19 through any excessively worn and loose part of the bearing, so that the link bore would remain filled, even under adverse conditions of operation.

I claim:—

1. In apparatus of the character described, an upper bearing, a lower bearing including a fixed element forming a pivot mount for the upper bearing, an oil inlet stationary with respect to said fixed element, an oil duct carried by the pivoted structure, having free communication with the fixed bearing surface of the lower bearing, and leading to the upper bearing, said lower bearing imposing high resistance to leak therefrom, said duct being of cross-section so small for a substantial portion of the upwardly extending length thereof as to retain oil therein by capillary attraction against the action of gravity, whereby intermittent charges of oil fed through the inlet will promptly reach the upper bearing.

2. In apparatus of the character described, a lower bearing having a fixed and a rocking element, a link having a tight fit on said rocking element, an upper bearing oscillating with said link, an oil inlet stationary with respect to said fixed element, an oil duct leading to said upper bearing supplied from said inlet by flow from said rocking bearing element across said tight fit and moving as a unit with the link, said inlet having a free passageway into the rocking bearing member, said lower bearing imposing high resistance to leak therefrom.

3. In a motor vehicle, a fixed supporting bearing member rigid with the vehicle structure, a complementary bearing member having a rocking movement thereon, a link rigid with said rocking bearing and extending upward therefrom, a bearing member carried at the free end of said link, means for lubricating said bearings, said means comprising a lubricant inlet at the fixed bearing member, a passageway transversely across the bearing surface leading from said inlet into said rocking bearing, said passageway affording a relatively open course of resistance to flow less than the resistance to escape from the bearing, said link having a longitudinal bore therein, a core substantially filling said bore, the ends of said bore having a substantially lubricant-tight connection with the bearing members associated therewith.

4. In a motor vehicle, a pair of associated bearing members, a support for the upper of said members having an oscillating movement about the lower of said members as a pivot, said lower bearing member including a fixed element, a lubricant inlet at said fixed element, a bore therefrom across the bearing surface of said pivoted bearing, said bore affording a relatively open low resistance path of flow into the pivoted member, and a lubricant-tight passageway along the oscillating structure leading from said bore to the upper bearing member.

5. In a motor vehicle, a pair of associated bearing members, a support for one of said members having an oscillating movement about the other as a pivot, said pivot bearing including a fixed element, a lubricant inlet at said fixed element, a passageway therefrom across the loaded side of said pivot bearing into the rocking element thereof, and a duct leading therefrom through the support into the oscillating bearing.

6. In a motor vehicle, a fixed supporting bearing member rigid with the vehicle structure, a complementary bearing member having a rocking movement thereon, a link rigid with said rocking bearing, a bolt carried at the free end of said link and a bearing about said bolt, means for lubricating said bearings, said means comprising a lubricant inlet at the fixed bearing member, a passageway extending across the loaded side of said supporting bearing into the structure of the rocking bearing member, said link having an oil-tight fit with respect to both said rocking bearing and said bolt and having a bore conveying the lubricant from said rocking bearing to said bolt, and a passageway through said bolt leading the lubricant to the bearing surface thereof.

7. In a tension shackle for a motor vehicle, a bearing member fixed on the frame, a coacting bearing member having a rocking movement with respect thereto, an arm extending upward from said rocking bearing and rigid therewith, a bolt carried by the upper end of said arm and fixed thereto, means for conveying lubricant from said frame to said bolt, said means including a passageway longitudinally through said arm, communicating with a corresponding passageway from said coacting bearing and leading to a passageway in said bolt.

8. A tension shackle comprising a fixed bearing member on the vehicle frame, a bearing member rocking thereon, a link having a lubricant-tight connection with said rocking bearing, a bolt carried at the free end of said link, a fixed lubricant inlet at the frame admitting lubricant to said rocking bearing through a passageway extending transversely across the bearing surface and affording a relatively free path of resistance to oil flow less than the resistance to escape from the bearing, and a passageway communicating with said bearing surface and leading upward to supply lubricant to the bearing of said bolt.

9. A tension shackle comprising a fixed bearing member carried on the vehicle frame, a complementary rocking bearing thereon, an upwardly extending link having a lubricant-tight fit on said rocking bearing, a bolt having a lubricant-tight fit in the upper end of said link, a lubricant inlet fixed on the frame and delivering through an open passageway transversely into the rocking bearing, a core substantially filling a bore longitudinally of the link, the passageway in the rocking bearing delivering across the fitted connection thereof into said filled bore, said filled bore feeding into said bolt across the fitted connection thereof, the resistance to flow imposed by the passageway from the inlet to the upper bolt being substantially less than that restraining leak of lubricant from the fixed bearing.

10. A tension shackle comprising a frame eye having a bushing therein, a frame bolt pivoted in said bushing, an upwardly extending link having an oil-tight fit on the end of said bolt, a spring bolt having an oil-tight fit in the upper end of said link, a lubricant passage through said frame bolt longitudinally through said link and into said spring bolt, said passageway extending across the tight fit of the bolts in the link, said passageway having an inlet in the bearing surface of the rocking frame bolt, an inlet member fixed in the frame eye and delivering to said bolt inlet, the length of bearing intervening between the inlet and the ends of the frame bolt affording a resistance to lubricant flow greater than that imposed by the passage from the lower bolt to the upper bolt.

11. A tension shackle comprising a frame eye having a bushing therein, a bolt rocking in said bushing, an upwardly extending link having an oil-tight fit on the end of said bolt, a spring bolt having an oil-tight fit in the upper end of said link, a lubricant passageway extending through said frame bolt longitudinally through said link and into said spring bolt, said passageway extending across the tight fit of the bolts in the link, said passageway having an inlet in the bearing surface of the rocking frame bolt, an inlet member fixed in the frame eye and delivering to said bolt inlet, the bearing structure intervening between the frame inlet and the ends of the frame bolt affording a resistance to loss of lubricant greater than that imposed by the passage from the lower bolt to the upper bolt, and a solid core substantially filling the bore in the link and affording a capillary passage therethrough.

12. A tension spring shackle comprising a fixed support on the frame, a rocking bearing member on said support, a link rigid with said rocking bearing member and extending upward therefrom, a bolt fixed to the upper end of said link, a lubricant inlet at said frame, said inlet delivering across the loaded side of said bearing on the frame to pass the lubricant thereacross under pressure into a corresponding passageway in said lower rocking bearing member, and a passageway extending upward along said shackle structure and affording a substantially lubricant-tight path to the bearing surface of the upper bolt.

13. In a tension shackle, means for conveying lubricant from the frame to the spring bolt thereabove, said means including a passageway through the body of the shackle structure, affording a substantially leak-tight course for the upward flow of the lubricant from the frame to the spring bolt, the lubricant being conveyed from the frame to the rocking shackle part associated therewith by flow across the loaded part of the corresponding bearing surface.

14. A tension shackle comprising in combination, a supporting bearing including a fixed frame part and a shackle part having a rocking mount thereon, the outer of said parts having a bushing press-fitted thereinto, a pair of links rigid with said rocking member, a bolt carried by the upper ends of said links, means admitting lubricant into the fixed frame member, a passageway through the bushing delivering at the loaded part thereof into a corresponding passageway extending through one of the links, and delivering through the upper of the bolts to supply the latter with lubricant.

15. A tension shackle comprising an eye on the frame, a bushing therein, a bolt through said bushing, a link on said bolt, a bolt through the upper end of said link, and a second link connecting the outer ends of said bolts, a bore through the bushing conveying lubricant across the loaded surface thereof into the lower bolt, both of said bolts being secured to one of said links to form a yoke therewith, and an oil-tight passage through said yoke leading lubricant from the lower to the upper bolt.

16. A tension shackle comprising a bushing press-fitted in a frame eye, a shackle bolt assembly comprising a link having a pair of bolts extending therethrough and having an oil-tight connection therewith, the lower of said bolts mounted in said bushing, a spring eye pivoted upon the upper of said bolts, a second link extending over the protruding ends of said bolts, means comprising an inlet fitting conveying lubricant across the frame eye to pass from the loaded part of the bushing into a radial bore in the lower bolt, and a passageway from the lower bolt to the upper bolt, said passageway extending across the oil-tight connections of the bolts with said first link.

17. A tension shackle comprising a shackle link, a lower bolt having its head tightly fitted in one of the link eyes, an upper bolt having its head tightly fitted in the other eye of said link, a longitudinal bore through said link communicating with corresponding bores in said bolts, axial bores in said bolts plugged at the outer ends thereof, the lower of said bolts having a radial inlet bore terminating at the loaded side thereof, a bushing encircling said bolt, and an aperture through the bushing registering with said radial bore, whereby lubricant admitted through said aperture will be elevated through the passageway to supply the bearing of the upper bolt.

18. In a motor vehicle, a frame having an eye, a bushing therein, a tension shackle including a bolt in said bushing, means for conveying lubricant from the frame into said bolt, said means comprising an aperture through the loaded side of said bushing, a radial bore in said bolt substantially aligned with said aperture, and a passageway leading from said bolt to the upper bearing of said shackle.

19. The combination set forth in claim 18 in which the passageway comprises a longitudinal bore through one of the shackle links, substantially filled with a solid core.

20. In a motor vehicle, means for conveying lubricant from the frame into a tension shackle structure thereon, said means comprising a pipe terminating in a bore leading into the frame eye, said eye having a bushing press-fitted thereinto provided with a peripheral outer groove registering with said pipe end, said bushing having an aperture therein delivering from said groove through the part thereof on which the load of the body is sustained, a bolt in said bushing having a radial bore substantially aligned with said bushing aperture, a flat on said bolt at the outer end of said radial bore, and a lubricant conduit in said shackle structure leading from said radial bore to the upper bolt.

21. In a motor vehicle, means for conveying lubricant from the frame into a shackle structure thereon, said means comprising a pipe terminating in a bore transversely through the frame eye and plugged at the outer end thereof, said eye having a bushing press-fitted thereinto, provided with a peripheral outer groove registering with the extremity of said bore, said bushing having an aperture therein delivering through the part of said bushing on which the load of the body is sustained, whereby lubricant will flow without substantial leak into the bolt on the shackle.

22. A tension shackle comprising an eye on the frame having a bushing press-fitted thereinto, a shackle yoke structure including a bolt in said bushing, a link and a second bolt sustaining the spring eye, a second link connecting the free ends of said bolts, said yoke structure comprising a rigid entity having a U-shaped oil duct therethrough terminating at the loaded surface of the frame bushing, means admitting lubricant to said duct, said means comprising an inlet through the eye, and a groove in the outer surface of the bushing leading from said inlet through an aperture in the loaded side of said bushing, said oil duct having a depending outlet through the spring eye bolt.

23. A tension shackle comprising an eye on the frame having a bushing press-fitted thereinto, a shackle yoke structure including a bolt in said bushing, a link and a second bolt sustaining the spring eye bushing, a second link connecting the free ends of said bolts, said yoke structure comprising a rigid entity having a U-shaped oil duct therethrough terminating at the loaded sides of the two bushings, means admitting lubricant from the frame to said shackle yoke, said means including a bore substantially diametrally through the eye, plugged at its outer end and delivering to a peripheral groove about the bushing, said groove delivering through an aperture in the bushing at the loaded side thereof.

24. In a motor vehicle, means for conveying lubricant from a part on the vehicle structure to an associated bearing at higher level performing a limited oscillating movement about said part, said means including a passageway leading upward to said upper bearing, said passageway being filled to substantially reduce the effective cross-section thereof, for a substantial part of the length thereof.

25. In a motor vehicle, means for conveying lubricant from a part on the vehicle structure to an associated bearing at higher level performing a limited oscillating movement thereabout, said means including a pasageway leading upward to said upper bearing, and a core substantially filling a substantial part of the length of said passageway.

26. In a motor vehicle, means for conveying lubricant from a part on the vehicle structure to an associated bearing at higher level performing a limited oscillating movement about said part, said means including a passageway leading upward to said upper bearing, said passageway having a solid core held therein to afford a passageway normally maintained filled with oil by capillary action.

27. A tension shackle comprising a link, a pair of bolts press-fitted into the eyes of said link, stop means to predetermine the angular position of said bolts relative to said link, said bolts being of smaller diameter beyond said link, whereby in assembly of said bolts to said link, the bearing surface of the bolts will remain intact, a longitudinal bore through said link communicating with corresponding radial bores in said bolts, said radial bores communicating with corresponding axial bores plugged at their outer ends, said axial bores at their inner ends communicating with corresponding radial bores extending toward each other, a frame eye having a bushing therein lodging the lower of said bolts, a spring eye encircling the upper of said bolts, a complementary link over the free ends of said bolts, means securing said complementary link with respect to said bolts, means admitting lubricant from the frame, said means including a terminal bore into the frame eye, a peripheral groove in the frame bushing communicating with the end of the bore, said bushing having an aperture therein at said groove and substantially aligned with the radial bore at the inner end of the axial bore of the lower bolt.

28. In a vehicle structure, a channel frame having a reversely bent part, a fixed bearing thereat, a tension shackle having an upwardly extending link pivotally mounted at said fixed bearing, oil passages associated with said shackle supplied from said fixed bearing, and a lubricant pipe lengthwise of the channel frame delivering into said fixed bearing for supplying lubricant to said shackle, the terminal structure of the pipe protected in the channel of the frame.

29. Means for lubricating from a remote source a tension shackle at the end of a channel frame, said means including a flow controlling terminal fixed at the channel frame at a distance from the tension shackle, a length of pipe supplied from said fitting lodged in the channel structure at the end of said frame and delivering into a bore in the channel frame eye, a tension shackle having a lower bolt mounted in said eye and a passageway associated with said tension shackle to convey the lubricant from said bore to the shackle bearings.

30. In apparatus of the character described, a lower bearing including a bolt and a fixed bearing member therefor including a bushing thereabout, a link connected to the rocking element of said bearing, an oscillating bearing carried by said link, a lubricant inlet at said fixed element substantially midway between the ends thereof, a bore rigid with said link and delivering lubricant from said inlet to said oscillating bearing, said lower bearing imposing high resistance to leak from the ends thereof.

31. In apparatus of the character described, a pivoted support, a bearing mounted on said support at a level above the pivot and oscillating with the support, means for intermittently lubricating said bearing, said means including a fixed inlet, a conduit having a common swiveling axis with said support and leading to said bearing, said swiveling surface affording a greater resistance to leak of lubricant therefrom than exists in the length of the passageway from said fixed inlet to said bearing, a substantial portion of the length of said conduit being of effective bore so small as to maintain lubricant therein by capillary action.

32. In apparatus of the character described, a fixed bearing member, a structure having a bearing part pivoted with respect to said fixed member and extending upward therefrom, a bearing member carried on said structure and oscillating therewith, a conduit extending to and along said pivoting support to said oscillating bearing, a lubricant inlet at said fixed structure leading to said conduit, the lower bearing part of said structure affording free transverse passage to the oscillating structure and imposing high resistance to leak therefrom.

33. In apparatus of the character described, a lower bearing having a fixed element, an oscillating structure including a bearing member rocking on said fixed element, a bearing at higher level oscillating with said structure, an inlet in the fixed bearing element feeding across the bearing surface thereof into a duct rigid with said oscillating structure, said duct in turn delivering to the higher bearing, said duct affording a relatively free passageway from said inlet, said lower bearing imposing high resistance to leak therefrom, whereby after pressure application has ceased, some of the lubricant in the duct will return by gravity flow to oil the lower bearing.

34. In a motor vehicle, a supporting bearing member rigid with the vehicle structure, a complementary bearing member having a rocking movement thereon, a link rigid with said rocking bearing, a bearing member oscillating with the free end of said link, means for lubricating said bearings, said means comprising a lubricant inlet at the fixed bearing, a passageway therefrom transversely across the bearing surface into the rocking bearing element, said passageway affording a relatively open course for lubricant flow and of resistance less than that encountered in the passage of lubricant by leak through the ends of the bearings, said link having a bore conveying the lubricant from said rocking bearing to said oscillating bearing, said bore having a lubricant-tight relation with respect to the bearing members at the opposite ends thereof.

Signed at New York in the county of New York and State of New York this 22nd day of March, A. D. 1926.

JOSEPH BIJUR.